Nov. 18, 1958 B. W. ABRAMS ET AL 2,861,254

PULSE-ECHO SYSTEM

Filed June 15, 1954

*INVENTORS*
BERNARD W. ABRAMS
JEROME ARBERMAN
BY

*William J. Flynn*
ATTORNEY

United States Patent Office

2,861,254
Patented Nov. 18, 1958

2,861,254

PULSE-ECHO SYSTEM

Bernard W. Abrams, South Euclid, and Jerome Arberman, Cleveland, Ohio, assignors to Clevite Corporation, Cleveland, Ohio, a corporation of Ohio Application June 15, 1954, Serial No. 436,884

3 Claims. (Cl. 340—3)

This invention relates to an arrangement in a pulse-echo system for discriminating between target echoes and unwanted echoes, and is particularly directed to such an arrangement for an underwater acoustic pulse-echo system.

In the operation of underwater acoustic transducers particularly in shallow water, it is necessary to discriminate between signal reflections from a target and unwanted, spurious reflections, such as reflections from the sea bottom, from the surface of the water, and from particles in the water. Such discrimination cannot be accomplished satisfactorily on the basis of echo amplitude alone since genuine target echoes would be relatively low in amplitude if the target is a considerable distance from the transducer, whereas unwanted echoes might be of relatively large amplitude, particularly in shallow water. Even though a certain degree of improvement has resulted from the use of a time variable gain amplifier in the receiving circuit, so that the receiver does not respond to the first-received, high amplitude, unwanted echoes, the results heretofore have not been sufficiently reliable. In practice, the problem of distinguishing the target echoes from other, unwanted echoes has rendered such devices unreliable in relatively shallow water operation.

The present invention is based upon the recognition that, following a transmitted signal pulse, the sum total of the unwanted, non-significant echoes of that pulse decreases gradually in amplitude over an interval of time, while the echo from a target object, such as a mine or the hull of a vessel, occurs as an abrupt pulse. The present invention takes advantage of this difference in the respective characteristics of the unwanted echoes and the target echo by the provision of a differentiator in the receiver associated with the transducer which discriminates between the gradually diminishing unwanted echoes and the abrupt target echo.

Accordingly, it is an object of the present invention to provide a novel arrangement in a pulse-echo system for discriminating between significant and unwanted reflections.

It is also an object of this invention to provide a novel arrangement in a pulse-echo system which is capable of discriminating between abrupt target echoes and the sum total of unwanted echoes, which has a gradually diminishing amplitude over a period of time.

A specific object of this invention is to provide a novel arrangement in an underwater acoustic pulse-echo system for discriminating between reflections from a target, on one hand, and reflections from the sea bottom, the surface of the water, or particles in the water, on the other.

Other and further objects of the present invention will be apparent from the following description of a particular embodiment of this invention intended for use in an underwater acoustic transducer system.

Figure 1:
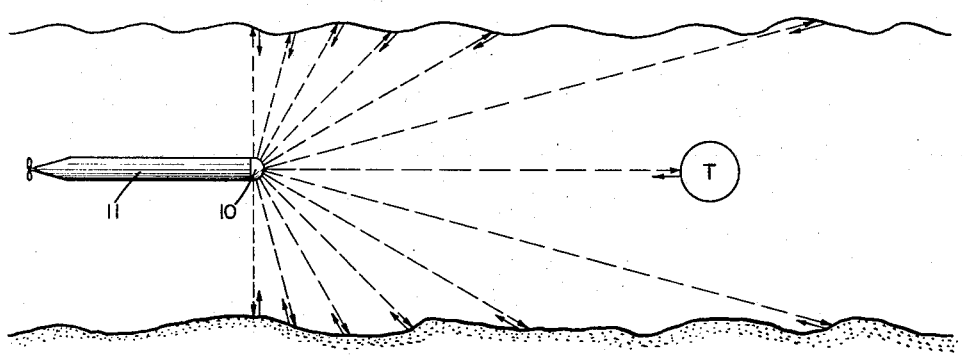
Figure 1 is a view illustrating schematically the transmission of signal pulses from an underwater transducer and the reflection of those transmitted pulses back to the transducer from the target object and also from particles in the water, from the sea bottom, and from the surface of the water.

Referring to Fig. 1, reference numeral 10 indicates a conventional underwater transducer, which may be mounted on a torpedo 11 or other underwater device. For example, the transducer might be associated with a torpedo which is to seek out and destroy any target object located by the transducer. Thus the target might be a surface or underwater vessel, or a mine. In operation, the transducer 10 transmits pulses and receives reflections of those pulses, which may be utilized to direct the torpedo toward the target. However, in practice severe difficulties are encountered due to reflections of the signal pulses from the waves at the surface of the water, from particles in the water, and particularly from the sea bottom. This raises a particularly serious difficulty in shallow water, where the echoes from the sea bottom would be of relatively high amplitude, since the transducer would respond to such echoes and misdirect the torpedo.

Figure 2:
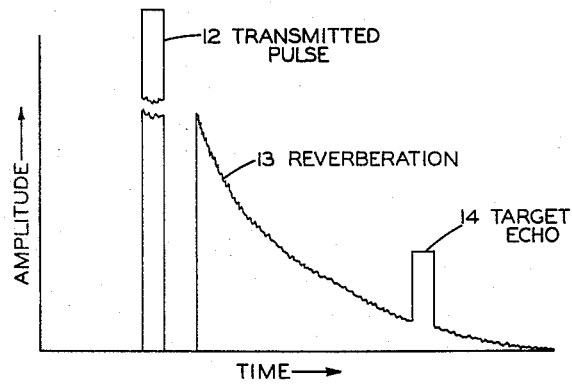
Figure 2 shows the variation of signal amplitude with times as the signal pulse is transmitted and the various echoes of that pulse are received at the transducer.

Referring to Fig. 2, the transmitted pulse 12 ordinarily would be of relatively short duration, with an approximately rectangular wave form. The transmission is usually broadly directional, so as to take in a suitably wide search range. For example, the transducer may be substantially omnidirectional forward of the torpedo. The various reflections of the transmitted pulse from the surface of the water, from particles in the water, and from the sea botom are grouped generally under the term "reverberation." While the reverberation 13 consists of a series of discrete individual pulse reflections, their sum total at the transducer is a slowly decaying signal, which starts shortly after the transmitted pulse and diminishes in roughly exponential form over a period of time. This is so because the reverberation consists of individual echoes from portions of the surface of the water which are spaced progressively in distance (and thus, in time) away from the transducer, from reflective particles in the water which are similarly spaced progressively in distance and time away from the signal source, and from surfaces along the sea bottom which are also spaced progressively in distance and time away from the signal source. Accordingly, the echoes decrease gradually in amplitude and reach the transducer 10 later in time as the various reflecting surfaces are farther away from the signal source. The target echo 14, the time of whose occurrence is determined by the distance of the target object T away from the signal transducer, occurs as an abrupt pulse having an amplitude depending upon the distance of the target object from the transducer.

Figure 3:
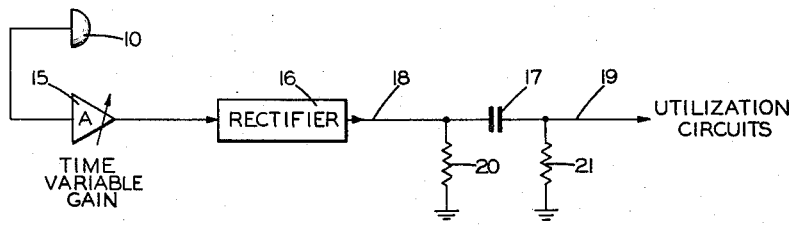
Figure 3 is a schematic circuit diagram of the receiving circuit associated with the transducer.

Figure 3 illustrates schematically a suitable receiving circuit at the transducer in accordance with the present invention which is capable of discriminating between the gradually decaying reverberation and the abrupt target echo. The receiving circuit associated with the transducer 10 includes a suitable multi-stage amplifier 15 which has a time variable gain characteristic, such that the gain of the amplifier increases with time. This is for the purpose of minimizing the response of the amplifier to the initial abrupt leading edge of the reverberation, so that it does not actuate the utilization circuits, after which the gain of the amplifier is adequate to respond properly to the decaying reverberation, as well as to the target echo pulse. The output of the amplifier 15 is connected to a rectifier 16.

Prior to the present invention it has been the usual practice to connect the utilization circuits directly to the output of the rectifier. Obviously the output signal to such utilization circuits in that case would merely be proportional to the amplitude of the amplified, rectified target signals at that particular time, with no provision for discriminating reliably between the abrupt target echo and the unwanted echoes which form the reverberation.

This disadvantage is avoided in the present invention by the provision of a differentiator circuit which includes a suitable capacitor 17 connected in series between the output 18 from the rectifier 16 and the input 19 to the utilization circuits, with one terminal of the capacitor connected directly to the rectifier output and the other terminal of the capacitor connected to the input to the utilization circuits. A resistor 20 is connected between the rectifier output and ground and is provided for the purpose of discharging the capacitor 17 to ground between successive transmitted pulses. Another resistor 21 is connected between the other terminal of capacitor 17 and ground. In the operation of this arrangement, since the differentiator circuit in effect responds to the time rate of change of ampltiude, the capacitor 17 will pass to the utilization circuits the abrupt target echo pulse, but will reject the reverberation, whose amplitude is changing only gradually.

From the foregoing, it will be apparent that the present arrangement solves the problem of discriminating between target echoes and unwanted echoes whose sum total has a slowly changing amplitude characteristic in a particularly simple and efficacious manner which requires only a minimum modification of the conventional receiving circuits associated with the transducer.

While in the foregoing description and the accompanying drawing there is disclosed a particular preferred embodiment of the present invention and a specific application thereof to underwater transducer operation, it is to be understood that this invention is susceptible of use other than in underwater pulse-echo operation and that various modifications, omissions and refinements which depart from the disclosed embodiment may be adopted without departing from the spirit and scope of this invention. For example, the present invention may desirably be used in pulse-echo fathometers or in various radar systems.

We claim:

1. In combination, underwater acoustic transducer means for transmitting an abrupt acoustic signal pulse and for receiving signal echoes, a receiver circuit connected to said transducer means and operative to reduce the gain of signal echoes received initially and increase the gain of later-received signal echoes, and a differentiator in said receiver circuit capable of passing abrupt signal echoes and rejecting echoes of slowly changing amplitude.

2. The combination of claim 1, wherein said receiver circuit comprises a rectifier connected to the output of said amplifier means and said differentiator comprises a capacitor having one of its terminals connected to the output of said rectifier, a first resistance connected between said capacitor terminal and ground, and a second resistance connected between the other capacitor terminal and ground.

3. The combination of claim 2 comprising utilization circuit means connected to said other capacitor terminal.

References Cited in the file of this patent
UNITED STATES PATENTS

| | | |
|---|---|---|
| 2,364,209 | Green | Dec. 5, 1944 |
| 2,502,938 | Fryklund | Apr. 4, 1950 |